United States Patent [19]

Medina

[11] 4,221,153
[45] Sep. 9, 1980

[54] CORRUGATED FASTENER AND STRIP OF FASTENERS

[75] Inventor: Conrad R. Medina, Skokie, Ill.

[73] Assignee: Swingline, Inc., New York, N.Y.

[21] Appl. No.: 930,368

[22] Filed: Aug. 2, 1978

[51] Int. Cl.² ............................................ F16B 15/00
[52] U.S. Cl. .................................................... 85/11
[58] Field of Search .................. 85/13, 11, 17, 15; 206/343, 344

[56] References Cited

U.S. PATENT DOCUMENTS

| 461,154 | 10/1891 | Welteroth | 85/11 |
|---|---|---|---|
| 1,208,255 | 12/1916 | Williams | 85/13 UX |
| 1,328,911 | 1/1920 | Cary | 85/11 |
| 1,876,683 | 9/1932 | Johnson et al. | 85/11 |
| 2,156,682 | 5/1939 | Dimoush | 85/11 |
| 2,942,267 | 6/1960 | Cusumano | 85/11 X |
| 3,726,397 | 4/1973 | Springer | 85/11 |

*Primary Examiner*—Ramon S. Britts
*Attorney, Agent, or Firm*—Pennie & Edmonds

[57] ABSTRACT

The present disclosure relates to a corrugated fastener for joining two pieces of material in abutting relationship, the fastener having two spaced-apart corrugated loop sections and an intermediate curved tensionable section having a shape and size such that as the fastener is driven the curved tensionable section is substantially straightened and held under tension to draw the two pieces of material together. The disclosure also relates to an adhered strip of a plurality of such fasteners resembling a modified honeycomb configuration. The manner of collation of the adhered strip enhances the functional features of the disclosed fasteners.

3 Claims, 5 Drawing Figures

CORRUGATED FASTENER AND STRIP OF FASTENERS

BACKGROUND OF THE INVENTION

Prior fasteners of the corrugated type have employed intermediate sections to accomplish the joining of two pieces of material. Cary U.S. Pat. No. 1,328,911 issued June 22, 1920 is illustrative.

Prior patents have also suggested curved center sections (see Johnson U.S. Pat. No. 1,876,683 issued Sept. 13, 1932 and Dimoush U.S. Pat. No. 2,156,682 issued May 2, 1939) but none have shown a curved center section which is shaped, sized and operable as taught by the present invention.

Fastener strips such as those disclosed in Cusumano U.S. Pat. No. 2,942,267 have 15% to 30% of the surface of the fastener adhesively secured to the adjacent fastener requiring a large force to cleanly shear the leading fastener from the strip. The fastner strip of the present invention has only about 2% of the surface of the fastener adhesively secured to the adjacent fastener, yet, the resulting fastener strip is sufficiently functionally strong to withstand handling, vibration and recoil of a driving tool, while offering a substantially reduced force or resistance to the shearing of the leading fastener from the strip.

It has been determined that the integrity of a joint held together by a corrugated fastener depends primarily on three factors:

(1) design of the inclined ridges which effect pulling together of the joined pieces as the corrugated fastener is driven, (2) design of the center section, and the (3) quality and location of the bond between the surface of the corrugated fastener and the surface of the fastened pieces.

In corrugated fasteners having uniform corrugations or flutes, the integrity of the joint is only as good as the forces required to straighten the flute of the corrugated fastener positioned at the abutting surfaces of the two pieces of material.

Fasteners with straight intermediate sections such as Cary U.S. Pat. No. 1,328,911 have the tendency to tear the pieces being joined causing loosening of the joint. An intermediate section which is straight before driving cannot further tension or absorb energy during driving and create a joint tensioned by the driven fastener.

SUMMARY OF THE INVENTION

Broadly, the present invention comprises two spaced-apart sets of U-shaped loop sections inclined for diverse driving. A tensionable center section secured between the two sets which is shaped, sized and curved such that as the fastener is driven the center section is tensioned and substantially straightened.

It is a feature that the center section is straightened during driving to a degree to create a substantially straight section for effective tension in the joint.

It is also a feature that the collation of the present adhered strip is a modified honeycomb configuration. This type of collation allows the fastener to be driven fully in a single stroke in a manner for the fastener to impart the features and benefits to the fastened joint.

DESCRIPTION OF THE PREFERRED EMBODIMENT

Figure 3:
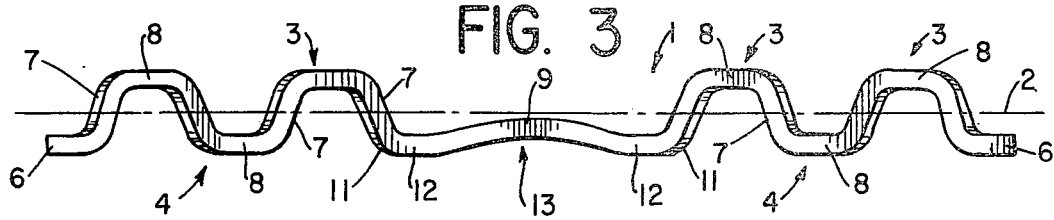
FIG. 3 is an enlarged plan view of the fastener.

Referring first to FIG. 3, fastener 1 includes an elongated curved tensionable intermediate section 13, U-shaped loop sections 3 curved in the same direction as curved tensionable section 13 and U-shaped loop sections 4 curved in the opposite direction as curved section 13. Fastener 1 also includes tip portions 6 at either end.

Each U-shaped section 3 and 4 includes two base portions 7 and one loop portion 8. Centerline plane 2 passes through the base portions 7 of the loop sections 3 and 4. Fastener 1 is preferably integrally formed as one piece of metal.

Tensionable section 13 includes two connection portions 11 for connecting U-shaped loop section 3 to tensionable section 13. Tensionable section 13 further includes two base portions 12 and arcuate member 9. Base portions 12 are positioned generally parallel to centerline plane 2 while arcuate member 9 has a curvature positioned to extend in the same direction as U-shaped section 3 in that the arcuate member 9 follows a line or profile starting upwardly from the left hand base portion 12 to a maximum point in the vicinity of the centerline 2 and then downwardly to the right hand base portion 12 (all as shown in FIG. 3). U-shaped sections 3 follow the same general pattern but extend further from centerline 2. Stated another way, arcuate member 9 extends upwardly to a position substantially below the maximum upward extension of loops 8 of U-shaped sections 3. Since arcuate member 9 has only a slight arcuate curvature it is capable of having its curvature reduced substantially to zero during driving.

Figure 4:
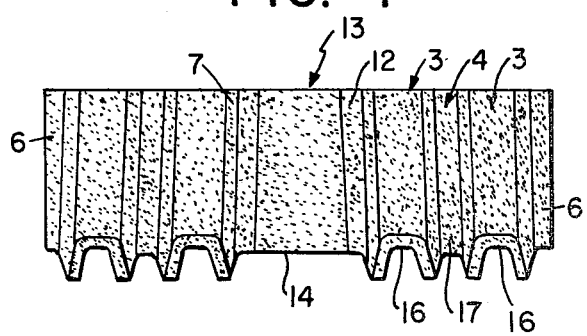
FIG. 4 is an elevational view of the fastener shown at the lower end of the fastener strip of FIG. 5.

Turning now to FIG. 4, it is seen that on the right hand side of fastener 1 arcuate member 9, base portion 12, U-shaped sections 3 and tip portions 6 all slant from top to bottom to cause the right hand part of the fastener to move to the right during driving. Also as viewed in FIG. 4, the left hand part of fastener 1 is correspondingly slanted to move to the left during driving to tension and to straighten the curved tensionable section 13.

Tensionable section 13 has lower edge portion 14, U-shaped sections 3 have sharpened sections 16 and U-shaped sections 4 have sharpened sections 17 to facilitate driving.

Figure 1:
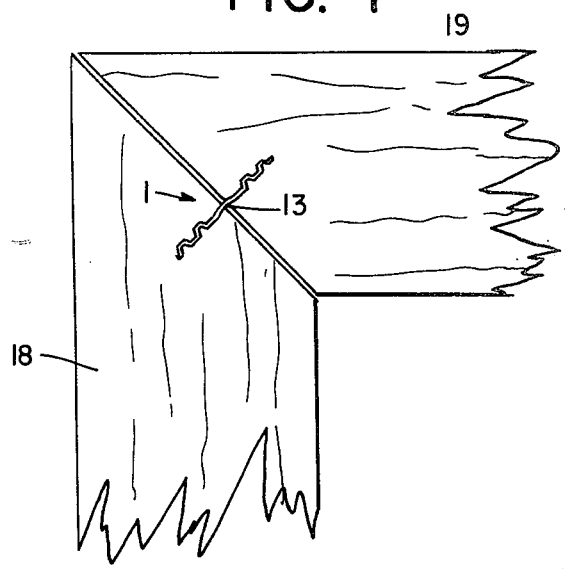
FIG. 1 is a plan view of two beveled slightly spaced-apart pieces of wood with the fastener positioned during the initial driving phase.
Figure 2:
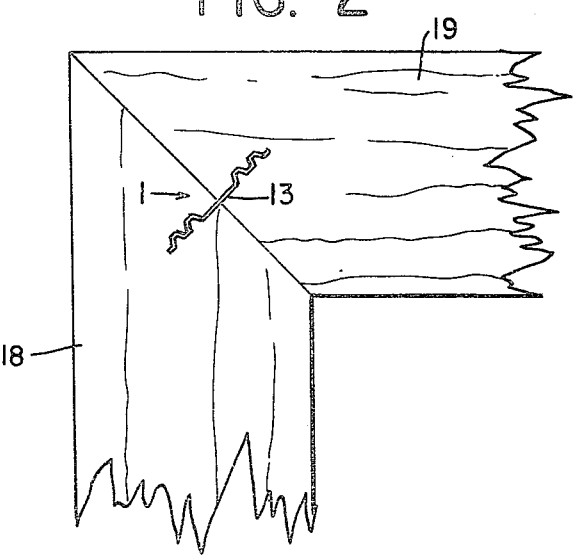
FIG. 2 is a plan view showing the pieces of wood and fastener of FIG. 1 after driving of the fastener.

In FIG. 1 fastener 1 is shown during initial driving of spaced-apart wooden pieces 18 and 19. FIG. 2 shows the fastener 1 upon completion of its driving with wooden pieces 18 and 19 having been pulled together under force and tension by the driving action of the fastener including the change in curvature of tensionable tensionable section 13. Fastener 1 has an overall-design to cause section 13 to reach substantially a straight position upon completion of driving. Though tensionable section 13 is shown as a straight line in FIG.

2, it is to be understood that there will be some residual curvature after driving since the forces involved will not completely straighten tensionable section 13.

Figure 5:
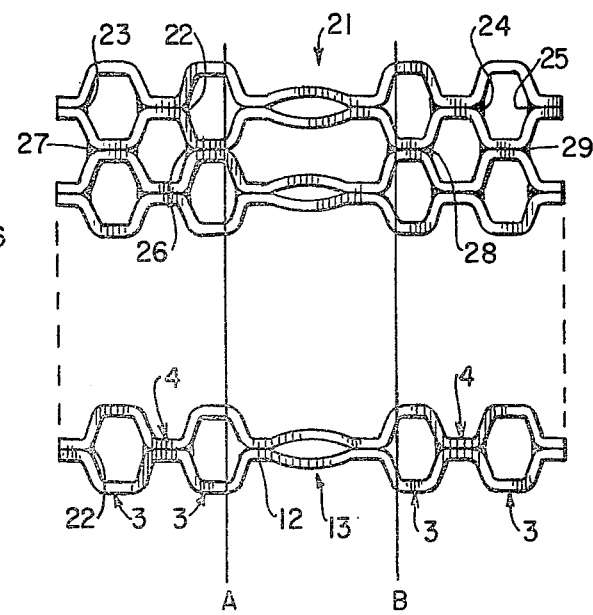
FIG. 5 is an exploded plan view of a strip of fasteners.

The fasteners are formed into nests, collations or strips 21 by applying adhesive only to the left of line A and to the right of line B as shown in FIG. 5. The surfaces thus temporarily adhered to one another are surfaces 22, 23, 24, 25 and 26, 27, 28, 29 of loops 8. The total fastener surface adhesively adhered is about 2% of the full fastener surface. The portions or sections between line A and B including the tensionable section are free from adhesive.

The fastener strip collated as shown in FIG. 5 permits the driver blade of a portable tool, such as a pneumatic tool for driving corrugated fasteners, to shear the leading fastener from the strip and affect the driving into a material, such as wood, through the six U-shaped sections thus allowing the middle section to freely straighten and hence drawing the pieces to be joined together. Adhesive present in the middle tensionable section between lines A and B, will cause an uneven pull by the fastener on the pieces to be joined. This is true because the adhesive or glue may adhere unevenly to the surface of the middle section.

I claim:

1. A corrugated fastener comprising
    (1) a curved elongated tensionable section including a curved arcuate member;
    (2) intermediate connecting means forming the end portions of said tensionable section;
    (3) a pair of loop sections with one portion of each loop attached to each intermediate connecting means and curved in the same general direction as said arcuate member;
    (4) a second pair of loop sections attached to the first pair of loop sections, said second pair of loop sections curved in a direction opposite to the first pair of loop sections;
    (5) each of said loop sections having one loop portion and two base portions with the base portions substantially in a plane;
    (6) the loops of said first pair of loop sections extending a substantial distance to one side of said plane, the loops of said second pair of loop sections extending a substantial distance to the opposite side of the plane and the arcuate member extending to the vicinity of but short of said plane in the same direction as the loops of the first pair;
    (7) at least one loop section on either side of the tensionable section being inclined so that during driving the loop section on one side moves away from the loop section on the other side to tension the tensionable section; and
    (8) said curved arcuate member being such that its curvature is reducible when tension is applied thereto during driving and when in place.

2. The fastener of claim 1 in which the tensionable section includes base portions for connecting the tensionable section to the connecting portions.

3. A fastener strip of nested fasteners of claim 1 in which each loop section includes an external loop surface comprising a nest of fasteners in which the loop surfaces of one fastener are adjacent to the loop surfaces of a neighboring fastener and in which a base portion of a tensionable section of one fastener is adjacent the base portion of the tensionable section of the neighboring fastener, each of the fasteners adhered to a neighboring fastener by adhesive applied only on and between loop surfaces of the fasteners and without adhesive being applied on and between said adjacent base portions.

* * * * *